United States Patent [19]
Pytlik et al.

[11] Patent Number: 5,628,902
[45] Date of Patent: May 13, 1997

[54] FILTER HOLDER

[75] Inventors: Dorothea Pytlik; Michael Borgmann, both of Solingen, Germany

[73] Assignee: Robert Krups GmbH & Co. KG, Solingen, Germany

[21] Appl. No.: 352,674

[22] Filed: Nov. 30, 1994

[30] Foreign Application Priority Data

Nov. 30, 1993 [FR] France .................................. 93 14308

[51] Int. Cl.⁶ .................................................. B01D 29/085
[52] U.S. Cl. .......................... 210/474; 210/477; 210/479; 210/482; 99/295; 99/302 R
[58] Field of Search ............................... 99/295, 302 R; 210/473, 474, 477, 479, 481, 482

[56] References Cited

U.S. PATENT DOCUMENTS

| | | | |
|---|---|---|---|
| 1,983,142 | 12/1934 | Moriya | 210/482 |
| 2,069,939 | 2/1937 | Browning | 210/477 |
| 2,187,187 | 1/1940 | Weinberger . | |
| 4,644,856 | 2/1987 | Borgmann | 210/481 |
| 5,326,472 | 7/1994 | Combe | 210/477 |

FOREIGN PATENT DOCUMENTS

| | | |
|---|---|---|
| 422708 | 8/1937 | Belgium . |
| 0388975 | 9/1990 | European Pat. Off. . |
| 546116 | 10/1922 | France . |
| 2454784 | 11/1980 | France . |
| 0515245 | 11/1992 | France . |
| 8110818.4 | 7/1981 | Germany . |
| 4129814 | 3/1993 | Germany . |
| 85480 | 7/1984 | Luxembourg . |

Primary Examiner—W. L. Walker
Attorney, Agent, or Firm—Young & Thompson

[57] ABSTRACT

Filter holder having a dish (1) designed to be mounted on an "espresso" coffee machine and having a cup (2) whose bottom wall forms a filtering surface (3) and which is designed to receive a quantity of coffee, the fineness of whose grounds may vary. The dish also has a collection chamber for froth (4) provided between its bottom (10) and the filtering surface (3), and communicating via an exit passage (5) with distribution funnels (6) enabling the infusion to flow out of the dish (1). The cup (2) has structure for partially blocking the filtering surface (3) of the bottom wall of the cup (2), this structure being formed by at least one blocking area (9) arranged in the bottom (10) of the dish (1) and distant from the bottom (10) at a certain level (A). The cup (2) is mounted so as to be able to move in height so as to occupy at least two positions, either a blocking position in which a part of the filtering surface (3) is brought adjacent to the level (A) of the blocking area (9), or an outflow position in which the filtering surface (3) is situated at a distance from the blocking area.

2 Claims, 3 Drawing Sheets

FILTER HOLDER

FIELD OF THE INVENTION

The invention concerns a filter holder designed to be mounted on a coffee machine of the "espresso" type having a dish for receiving a cup whose bottom wall forms a filtering surface and which is designed to receive a quantity of coffee, the fineness of whose grounds may vary. More particularly, it concerns a filter holder which has a collection chamber for froth provided between its bottom and the filtering surface of the cup, the said collection chamber communicating via an outlet passage with distribution funnels enabling the infusion to flow out of the said dish.

BACKGROUND OF THE INVENTION

In present-day "espresso" coffee makers, the production of froth is due to the expansion, in the infusion leaving the filter, of air bubbles which have been compressed generally to between 10 and 15 bars in the water circuit of the coffee maker. When it passes through the coffee grounds, the pressure of the water decreases, reaching atmospheric pressure on leaving the filtering surface.

This process for the production of froth is the same regardless of the fineness of the ground coffee used. However, it has been noted that the degree of grinding of the coffee affects the quality of the froth by modifying the pressure in the cup.

OBJECT OF THE INVENTION

The aim of the invention is to improve the production and the quality of froth by taking into account the pressure that exists in the water circuit and in the cup, and the fineness of grinding of the coffee used.

SUMMARY OF THE INVENTION

According to the invention, the filter holder has means for partially blocking the filtering surface of the bottom wall of the cup.

These means enable the outflow of the infusion in the cup, and therefore the pressure in the latter, to be regulated by varying the degree of blocking of the said filtering surface. In this pressure regulation, account is taken of the fineness of grinding of the coffee used, and this thus enables a quality froth to be obtained.

BRIEF DESCRIPTION OF THE DRAWINGS

The characteristics and advantages of the invention will, moreover, emerge from the following description, given for purposes of illustration, with reference to the accompanying drawings in which.

DETAILED DESCRIPTION OF THE PREFERRED EMBODIMENT

Figure 1:
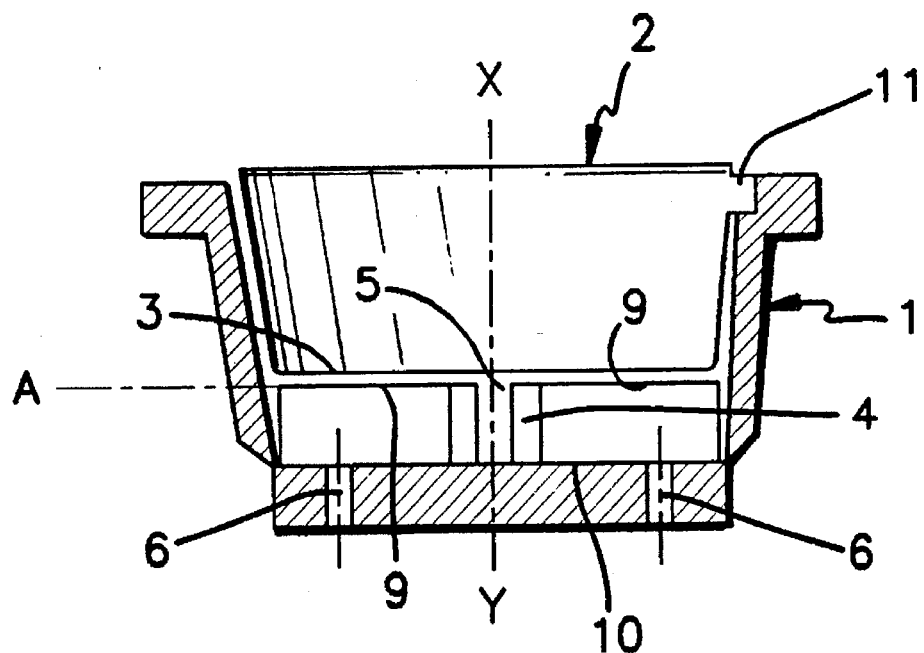
FIG. 1 is a view in vertical section of a filter holder according to the invention, equipped with a dish and a filter cup.
Figure 2:
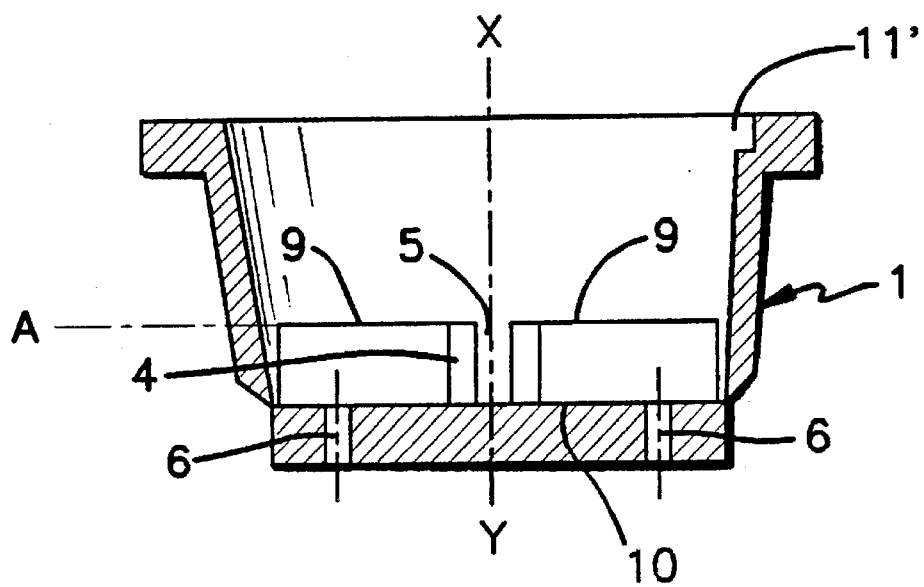
FIG. 2 is a vertical section of just the dish of FIG. 1.

The filter holder depicted in FIGS. 1 and 2 is designed to be removably mounted on a coffee machine of the "espresso" type and comprises, in a manner known per se, a dish 1 for receiving a removable cup 2 having a bottom with a filtering surface 3. The said cup 2 is designed to receive a quantity of coffee, the size of whose grounds may vary widely. The said dish 1 also has a collection chamber 4 for infusion situated beneath the said filtering surface 3 and communicating via an outlet passage 5 with distribution funnels 6 enabling the infusion to flow out of the said dish 1.

According to an essential characteristic of the invention, the filter holder has means for partially blocking the filtering surface 3 of the bottom wall of the cup 2.

These blocking means enable the pressure in the cup 2 to be regulated in a simple manner according to the degree of fineness of the ground coffee. In fact, when the coffee is finely ground, the outflow of the infusion into the collecting chamber 4 is slow. In this case, in order to accelerate this outflow, the blocking of the filtering surface 3 of the bottom wall of the cup 2 is reduced, and a more rapid fall in pressure in the said cup 2 results. On the other hand, if the ground coffee is less fine, the blocking of the filtering surface 3 is increased in order to produce a slowing in the outflow of the infusion into the dish 1, therefore maintaining significant pressure in the cup 2.

According to a preferred embodiment of the invention depicted in FIGS. 1 to 4, the filtering surface 3 of the bottom wall of the cup 2 has perforated zones 7 and non-perforated zones 8 and the blocking means are formed by blocking areas 9 carried by bosses arranged in the bottom 10 of the dish 1 and situated at a distance from the said bottom 10 at a level A in such a way that the bottom wall of the cup 2 is able to occupy a position adjacent to the level A of the said blocking areas 9. The said cup 2 is mounted so as to move in rotation about a vertical axis X-Y in such a way as to occupy filtering positions in the dish 1 corresponding to different degrees of covering of the perforated zones 7 by the blocking areas 9.

A conventional indexing system, such as snugs carried by the cup 2 and notches 11' carried by the dish 1, enables the angular position of the dish 1 in relation to the cup 2 to be maintained, so as to guarantee the selected blocking between the perforated zones 7 of the filtering surface 3 and the blocking areas 9. In order to improve the blocking, the said blocking areas 9 may be fitted with sealing joints, for example of silicone.

Figure 3:
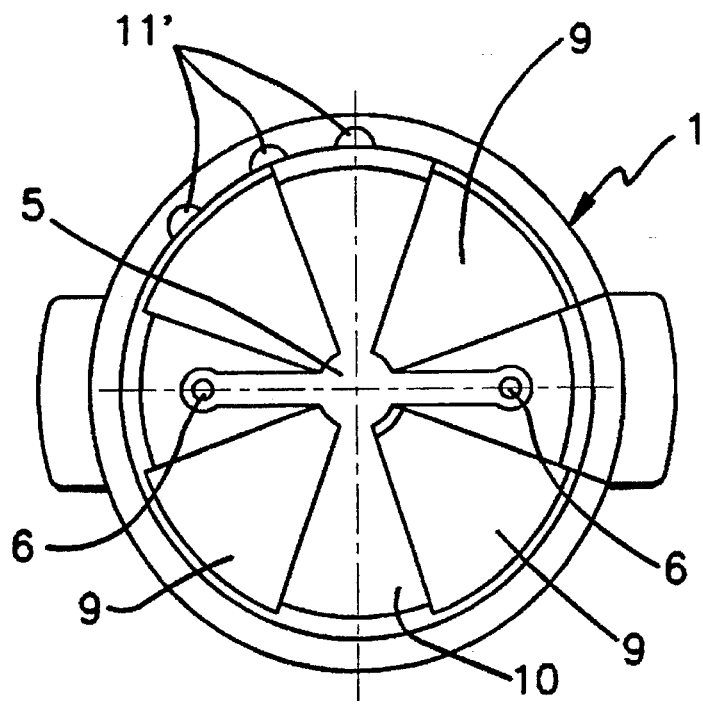
FIG. 3 is a plan view of the dish of FIG. 2.
Figure 4:
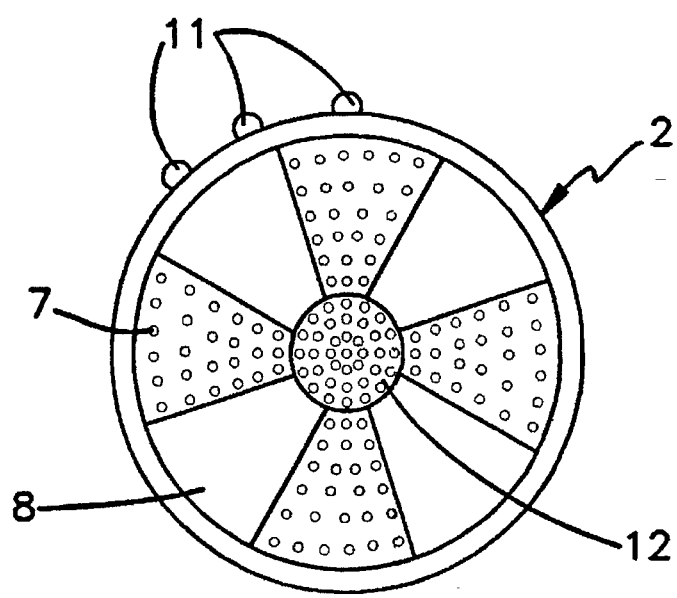
FIG. 4 is a plan view of the cup of FIG. 1.

Preferably, as shown in FIGS. 3 and 4, the filter holder is circular in shape, and the filtering surface 3 of the bottom wall of the cup 2 is formed from zones arranged as perforated sectors 7 alternating with non-perforated sectors 8. The sectors 7 may be four in number, as may the sectors 8. The blocking areas 9, as can be seen in FIG. 3, are also arranged in sectors, that is to say four alternating sectors in order to permit indexed regulation of the degree of blocking of the filtering surface 3 of the bottom wall of the cup 2. The enclosed space between the said bottom wall of the cup 2 and the bottom 10 of the dish 1 constitutes a collection chamber at least 5 mm deep.

Accordingly, when a high pressure, and therefore an abundant froth, is required, the cup 2 is positioned in the dish 1 in such a way that the blocking areas 9 are facing the perforated zones 7 of the filtering surface 3. On the other hand, if a low pressure, and therefore a light froth, is to be created, the said blocking areas 9 will be positioned facing the non-perforated zones 8 of the filtering surface 3. Several intermediate positions between the position where no perforated zone 7 is blocked, corresponding to a minimum pressure, and the position where only one perforated zone, called the safety zone 12, situated in the centre of the cup 2, remains constantly unblocked whatever the position of the said cup 2 in the reception dish 1. This arrangement corresponding to a maximum pressure in the cup 2.

With such a system, regulation of the pressure in the cup is afforded which takes account of the fineness of the grinding of the coffee.

According to another example embodiment of the invention not depicted in the drawings, the blocking means being formed by at least one blocking area 9 arranged in the bottom 10 of the dish 1 and distant from the said bottom 10 at a certain level A, the cup 2 is mounted so as to be able to move in height so as to occupy at least two positions, either a blocking position in which a part of the filtering surface 3 is brought adjacent to the level A of the blocking area, or an outflow position in which the filtering surface 3 is situated at a distance from the said area.

Figure 5:
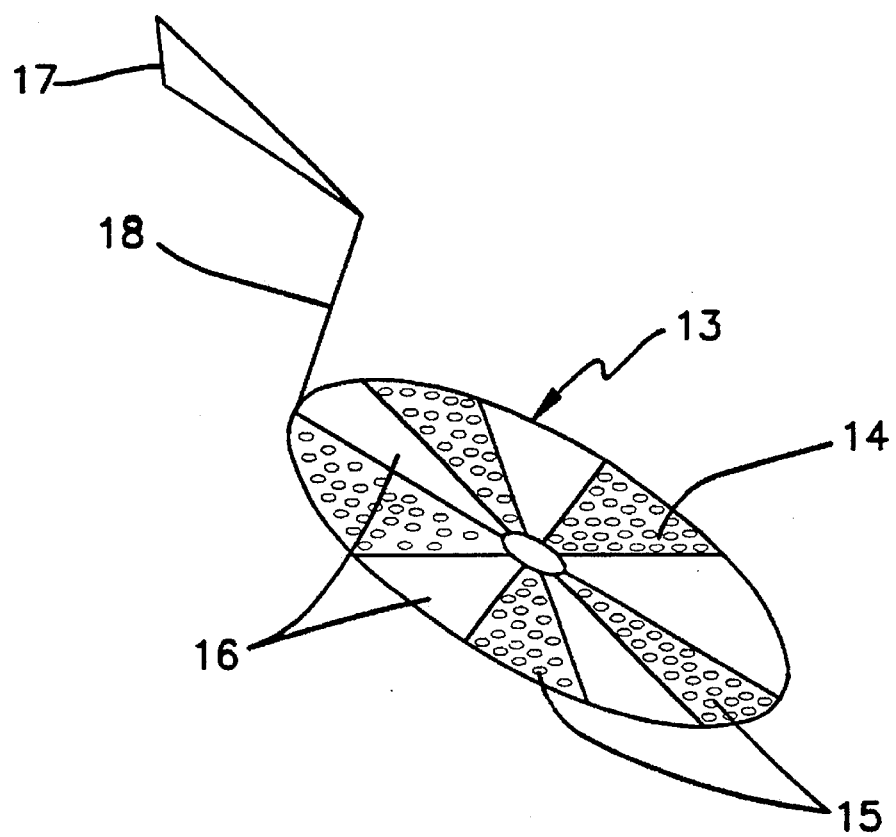
FIG. 5 depicts blocking means provided by a plate having blocking shutters according to a second embodiment of the invention.
Figure 6:
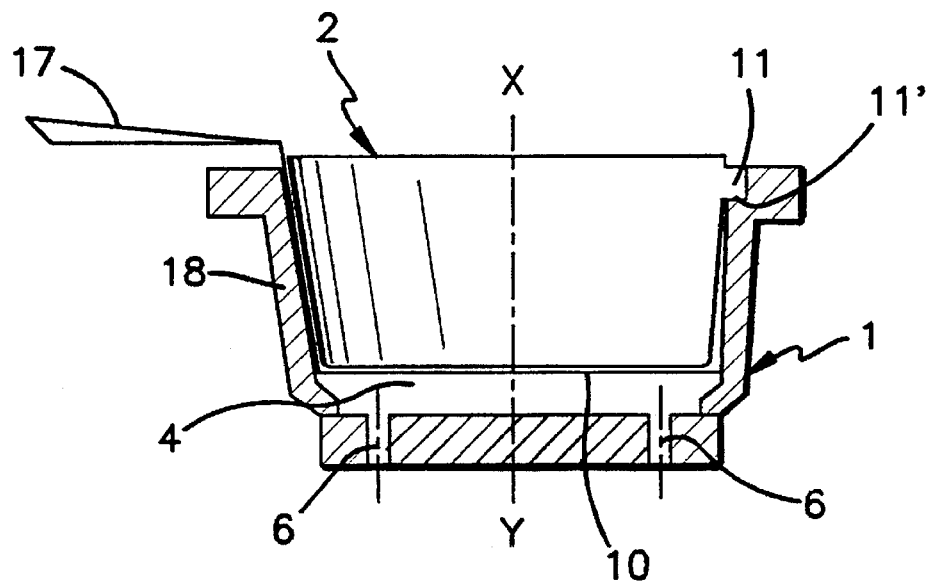
FIG. 6 depicts a filter holder provided with the plate having blocking shutters according to FIG. 5.

According to yet another embodiment illustrated in FIGS. 5 and 6, in which the same reference numbers have been used to designate parts that are similar to those in FIGS. 1 to 4, the cup 2 of the filter holder has alternating sectors, perforated and non-perforated (as illustrated in FIG. 4), and occupies a fixed position in the dish 1. In this case, the regulation of the outflow of the infusion into the dish 1 and therefore of the pressure in the said cup is obtained using blocking shutters movable with respect to the filtering surface 3 of the said cup 2. These shutters are formed in a plate 13 having a plane surface 14, similar in shape to the filtering surface 3 of the cup 2, as depicted in FIG. 5. The said shutters consist of perforated areas 15 alternating with solid areas 16. The plate 13 is mounted so as to move in rotation about the axis X-Y of the cup 2 and is provided with a handle 17 which projects between the respective upper edges of the dish 1 and of the cup 2 as depicted in FIG. 6. The handle 17 has an arm 18 which is able to move in a circle between the dish 1 and the cup 2 and which connects the handle 17 to the plane surface 14 of the plate 13. By turning the plate 13, and therefore the shutters, about the vertical axis X-Y, the perforated sectors of the filtering surface 3 are thus blocked to a greater or lesser degree, taking account of the fineness of the grinding of the coffee.

The invention enables the production of froth in "espresso" coffee makers to be improved by carrying out a simple regulation of the outflow of the infusion through the filtering surface 3 of the bottom wall of the cup 2 and consequently of the pressure that prevails in the said cup. This regulation takes account of the grinding size of the coffee used and of the desire on the part of the user to have a coffee that is more or less strong.

We claim:

1. Filter holder having a dish (1) designed to be mounted on an "espresso" coffee machine capable of producing infusion by liquid under pressure and having a cup (2) whose bottom wall forms a filtering surface (3) and which is designed to receive a quantity of coffee, the fineness of whose grounds may vary, said dish also having a collection chamber for froth (4) provided between its bottom (10) and said filtering surface (3), and communicating via an exit passage (5) with distribution funnels (6) enabling the infusion to flow out of said dish (1), said cup (2) further comprising means for partially blocking the filtering surface (3) of the bottom wall of the cup (2), wherein the filtering surface (3) of the bottom wall of the cup (2) has perforated zones (7) and non-perforated zones (8), and the blocking means are formed by blocking areas (9) carried by bosses arranged in the bottom (10) of the dish (1) and situated at a distance from the bottom (10) at a certain level (A), said cup (2) having its bottom wall adjacent to the level (A) of said blocking areas and being mounted for rotation about a vertical axis (X-Y) so as to occupy different positions in the dish (1) corresponding to different degrees of covering of the perforated zones (7) by the blocking areas (9).

2. Filter holder according to claim 1, wherein the perforated zones (7) and the non-perforated zones (8) forming the filtering surface (3) of the cup (2) are arranged as alternating sectors.

* * * * *